(No Model.) 3 Sheets—Sheet 2.

D. M. HOLMES.
MACHINE FOR APPLYING CHOCOLATE TO CREAM DROPS.

No. 485,326. Patented Nov. 1, 1892.

WITNESSES:
John Buckler,
Isabel Chester.

INVENTOR
D. M. Holmes,
BY A. M. Pierce,
ATTORNEY (No Model.) 3 Sheets—Sheet 3.
D. M. HOLMES.
MACHINE FOR APPLYING CHOCOLATE TO CREAM DROPS.
No. 485,326. Patented Nov. 1, 1892.
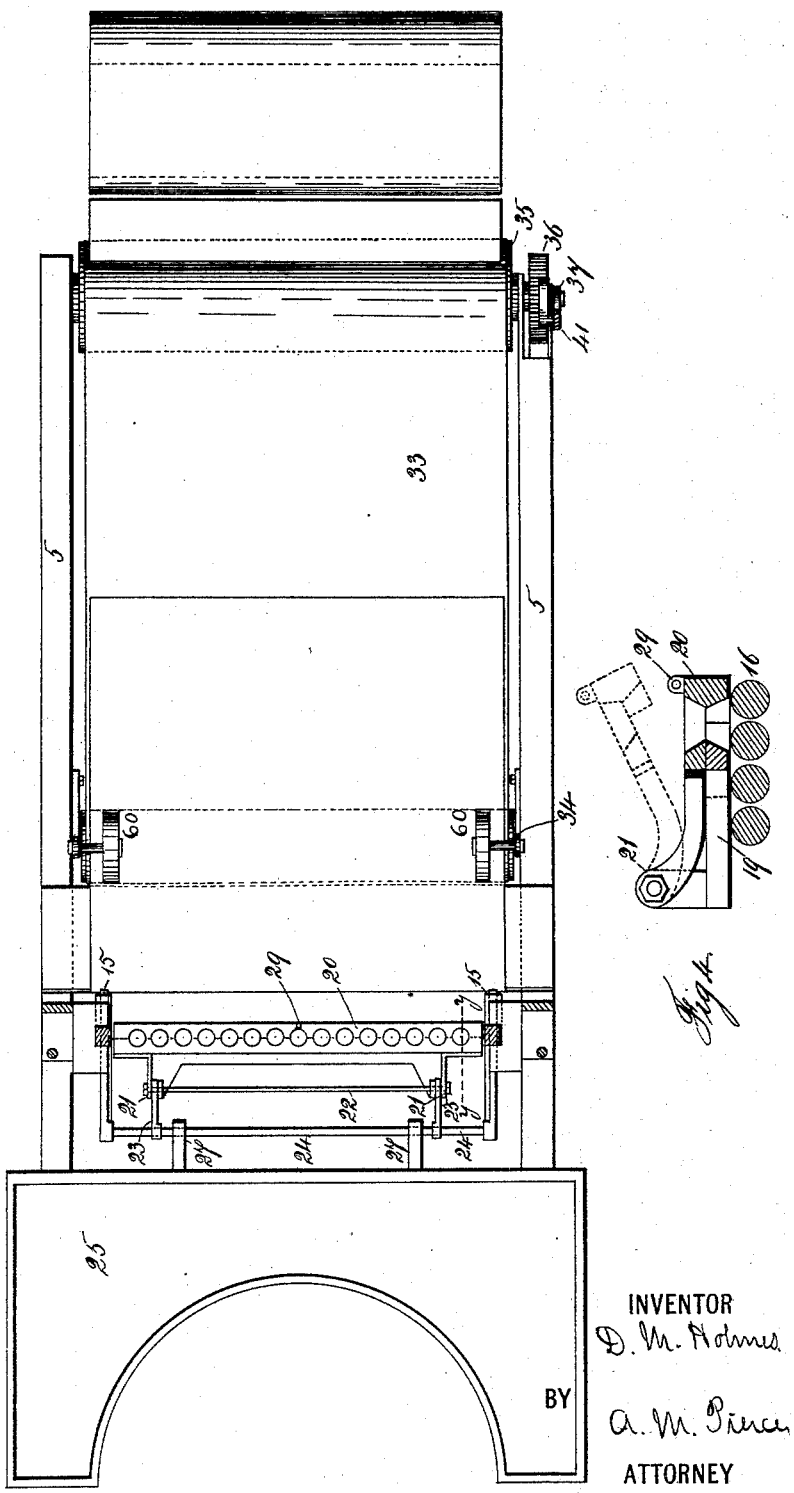
WITNESSES:
John Buckler
Isabel Chester
INVENTOR
D. M. Holmes
BY
A. M. Pierce
ATTORNEY

UNITED STATES PATENT OFFICE.

DANIEL M. HOLMES, OF ARLINGTON, NEW JERSEY, ASSIGNOR TO JOHN R. VAN DERVEER, OF NEW YORK.

MACHINE FOR APPLYING CHOCOLATE TO CREAM-DROPS.

SPECIFICATION forming part of Letters Patent No. 485,326, dated November 1, 1892.

Application filed March 21, 1892. Serial No. 425,656. (No model.)

*To all whom it may concern:*

Be it known that I, DANIEL M. HOLMES, a citizen of the United States, residing at Arlington, in the county of Hudson, New Jersey, have invented a new and useful Improvement in Machines for Applying Chocolate to Cream-Drops, of which the following is a specification.

My invention relates especially to machinery employed by confectioners, and has for its object the provision of means and mechanism designed for applying chocolate to cream-drops and similar goods, avoiding the tedious and expensive method of hand manipulation heretofore employed, thus greatly reducing the cost of the product.

To attain the desired end my invention consists, essentially, in certain novel and useful combinations or arrangements of parts and peculiarities of construction and operation, all of which will be hereinafter first fully described, and then pointed out in the claims.

Figure 1:
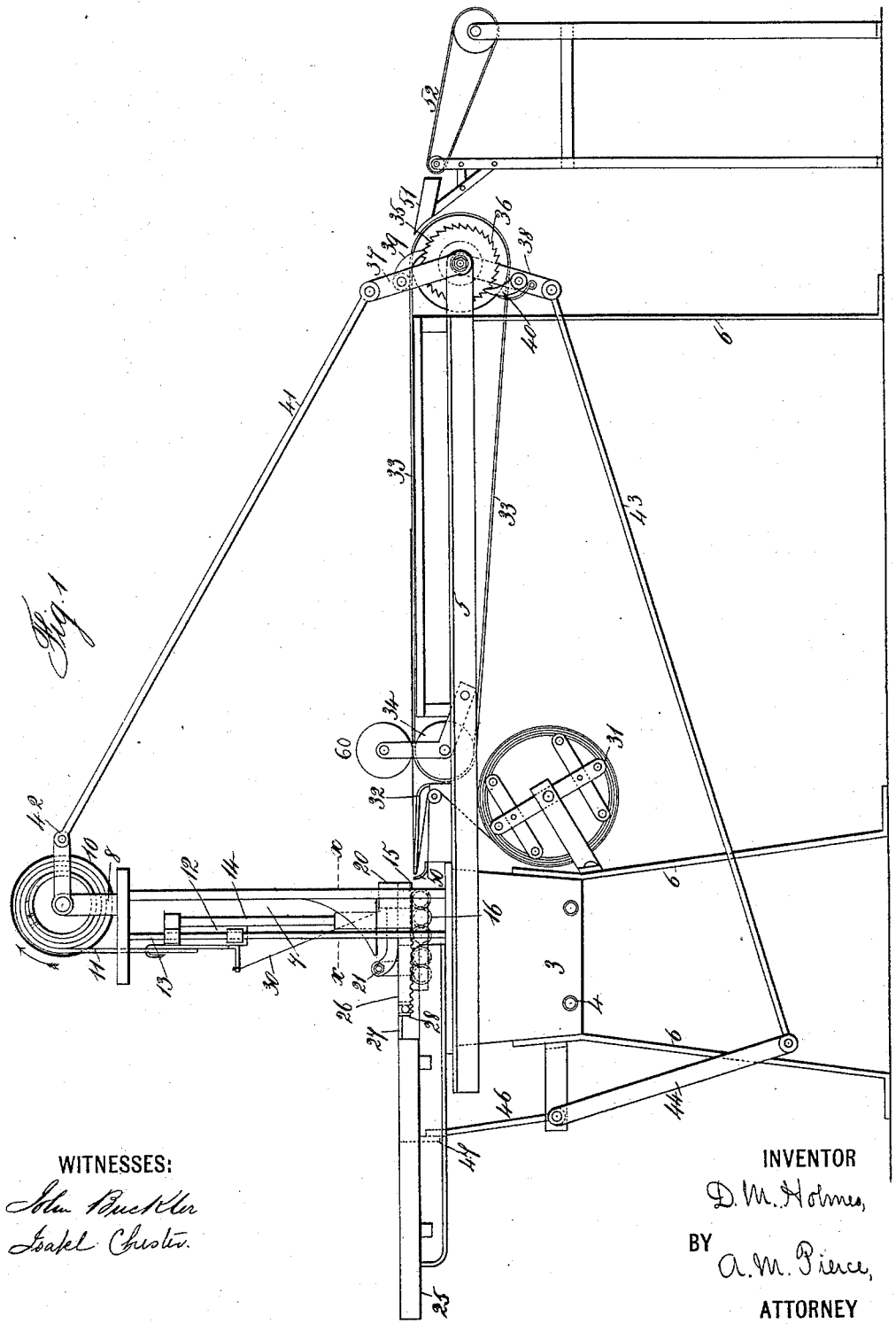
Figure 2:
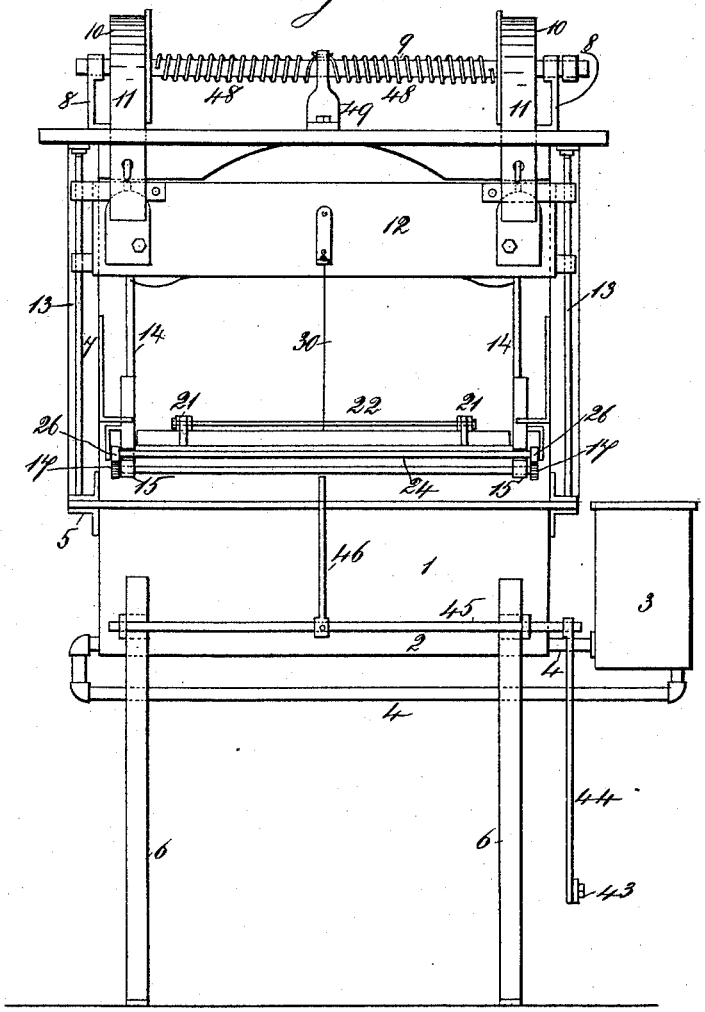

In the accompanying drawings, Figure 1 is a side elevation of my improved chocolate-cream machine. Fig. 2 is an end elevation thereof. Fig. 3 is a plan view of the feed-board and mechanism for manipulating the creams, that portion of the machine above line *x x* of Fig. 2 being removed. Fig. 4 is a cross-sectional view of the cream-receptacle at line *y y* of Fig. 3.

Similar numerals of reference wherever they occur indicate corresponding parts in all the figures.

The object of my present machine is to provide a device whereby a row or number of such creams may be dipped together and mechanically manipulated, and then the entire row simultaneously placed upon paper, which is automatically moved along as each row is deposited, the paper with the series of rows moved along a supporting-table upon an endless band in such a manner as to be easily separated into convenient lengths for handling and drying.

1 is a tank for holding melted chocolate, mounted above a water-receptacle 2, said receptacle having communication with a reservoir 3, open at top, the water circulating through the pipes 4. Any convenient means may be employed for heating the water to melt the chocolate and maintain it at the proper consistency—such, for instance, as a row of gas-burners. Extending from the top of the chocolate-tank is a table 5, the whole being supported by suitable legs 6. Mounted above the chocolate-tank is a frame 7, carrying bearings 8, wherein is mounted a shaft 9, having wheels or pulleys 10. Secured to pulleys 10 are straps 11, the free ends whereof are connected to a cross-bar 12, arranged to slide upon guides 13, secured to the frame 7.

14 are vertical bars detachably connected to the cross-bar 12 and carrying at bottom horizontal pieces 15, wherein are mounted rollers 16, said rollers being each provided at their ends with a gear-wheel or pinion 17. Just above the rollers 16 and resting thereon is a fixed cross-piece 19, extending between the rods 14. The front edge of this cross-piece 19 is cut out in a series of half-circles.

20 is a cross-piece hinged at 21 to a rod 22, said piece 20 having half-circular perforations in its lower portion corresponding to the semicircular cavities in piece 19, and entire circles in its upper portion, the perforations in pieces 19 and 20 together forming a receptacle the shape of and a little larger than a cream, the upper portion of each receptacle having the shape of an inverted cone. (See Fig. 4.) The rod 22 is connected by arms 23 to a bar 24, which in turn is removably connected to a board 25, resting upon the side pieces of the table 5, by means of pieces 27, provided with jaws 28, said table being arranged to hold the creams to which the chocolate is to be applied.

26 26 are racks secured to the bar 24, the teeth of said racks being arranged to mesh with the gears 17 when the parts are in the position shown in the drawings.

29 is an eye attached to the hinged cross-piece 20, and 30 is a manipulating chain, wire, or cord connected with said eye.

31 is a paper-reel mounted beneath the table 5, the paper being arranged to pass upward and around the edge of a shelf 32 in close proximity to the top of the chocolate-tank, the paper being protected against contact with the rollers 16 by a shield 50, thus preventing soiling with the melted chocolate. Across the shelf the paper passes to an endless carrier-belt 33, being held in contact therewith by wheels 60, and said belt passes around a roller 34 and a second driving-roller 35 at the end of the table 5. The shaft of the roller 35 bears a ratchet-wheel 36 and has two arms 37 and 38, bearing pawls 39 and 40, pivoted thereon. A rod or pitman 41 passes from the arm 37 to a crank 42, fixed at the extremity of the shaft 9, and a second pitman 43 passes from arm 38 to a lever 44, pivoted to a shaft 45, mounted beneath the board 25.

46 is a rod passing from said shaft to a bearing 47 beneath the board 25.

51 is a board placed in close proximity to the belt 33, and 52 is a sloping carrying-belt located just beyond the board 51 and arranged to carry the severed sections of paper bearing coated drops to a receiving-table conveniently located.

48 48 are springs coiled around the shaft 9, their ends being secured to a stud 49, the function of said springs being to normally rotate the shaft 9 in the direction indicated by the arrow in Fig. 1, assisting the raising of the cross-bar 12 and connected parts after they have been depressed.

The operation of my device is as follows: Chocolate being placed in the tank 1 and brought to the proper consistency by means of heat, the upper portion of the cream-drop-holding mechanism is turned backward on its hinges and a drop is placed within each semicircular cavity in the lower portion, resting upon the roller 16, when the upper portion is turned back into position, inclosing the drops in the cavities. The cross-piece 12 is now drawn downward and the cream-drops plunged into the melted chocolate and at once drawn upward to the position shown in the drawings. The surplus chocolate falls back into the tank, and by moving the board 25 longitudinally along the sides 5 of the table the racks 26 are caused to reciprocate with the table 25, rotating the rollers upon which the drops rest, thus assisting the removal of the surplus chocolate. The hinged portion of the drop-holder is now thrown back and the melted chocolate held in the cavity above each drop flows downward, thoroughly and evenly coating the creams. The table 25 is now pushed forward until the drops are carried off of the revolving rollers by which they are supported and are deposited in a row upon the paper, after which the table and the drop-holder are drawn back and another row of drops placed in position and the coating with chocolate is repeated, as above. As the cross-bar 12 is moved downward the pitman 41 is drawn back, moving the pawl 39 upon the teeth of the ratchet 36, and as the cross-piece returns to its elevated position the pawl engages with the ratchet, carrying the belt 33 and the paper thereon forward, making a space between the rows of creams, and, as the table 25 is pushed its full movement in depositing the creams upon the paper, the paper and belt 33 are caused to move in unison therewith through the medium of the rod 46, shaft 45, lever 44, pitman 43, arm 38, pawl 40, and ratchet-wheel 36. As the drop-covered paper reaches the end of the supporting-table it passes from the carrying-belt across the slot between the said belt and board at the end of the table, and when a sufficient number of rows have passed the operator draws a knife across the paper through the slot, severing the paper from the continuous sheet, and the severed portion is carried down the sloping belt 52 to any suitable drying-board for removal.

Having now fully described my invention, what I claim as new therein, and desire to secure by Letters Patent, is—

1. A machine for applying chocolate to cream-drops, in which is comprised a chocolate-tank, a vertically-reciprocatable cream-drop holder, a paper-reel, a carrying-belt, and means for imparting movement to the paper and carrying-belt, the whole combined and arranged to operate substantially as shown and described.

2. A machine for applying chocolate to cream-drops, in which is comprised a chocolate-tank, a vertically-reciprocatable cream-drop holder, means for removing the surplus melted chocolate from the drops after dipping, a paper-reel, an endless carrying-belt, and means for imparting an intermittent movement to the paper and carrying-belt, the whole combined and arranged substantially as shown and described.

3. In a machine of the character herein specified, a cream-drop holder consisting of a fixed portion and a hinged portion, as set forth, in combination with a bottom or support for the creams, consisting of a series of movable rollers, substantially as shown and described.

4. In a machine of the character herein specified, the combination, with the cream-drop holder, of a series of rollers located therebeneath, the shafts of said rollers bearing pinions, and racks adapted and arranged to cause said rollers to rotate, substantially as shown and described.

5. In a machine of the character herein specified, a cream-drop holder and agitator, in combination with a receiving-shelf, a paper-reel, and means for causing the paper to move over the receiving-shelf as the drops are deposited thereon, substantially as shown and described.

6. In a machine of the character herein specified, the combination, with the chocolate-tank, the frame supported thereabove, and the vertically-movable cross-bar mounted in said frame, of arms extending downward from said cross-bar and supporting a series of rollers, the shafts whereof are provided with pinions, a cream-drop-holding device being also supported by said cross-bar, and racks engaging with the pinions and connected to a horizontally-reciprocatable table, the whole arranged substantially as shown and described.

7. In a machine of the character herein specified, a drop-holder consisting of two portions hinged together, as set forth, the upper portion having inverted-cone-shaped passages therethrough, substantially as shown and described.

8. In a machine of the character herein specified, the combination, with the paper-reel and paper, of a guide-plate beneath the paper, having a lip projecting upward between the paper-supporting shelf and the chocolate-tank, substantially as shown and described.

9. In a machine of the character herein specified, the combination, with the carrying-belt, its supporting-roller, and the paper carried by said belt, of the bearing-wheels mounted above the said supporting-roller, substantially as shown and described.

DANIEL M. HOLMES.

Witnesses:
A. M. PIERCE,
ISABEL CHESTER.